United States Patent [19]

Beltchev

[11] Patent Number: 5,143,609
[45] Date of Patent: Sep. 1, 1992

[54] METHOD FOR DEWATERING AND DRYING A LIQUID/SOLID SLURRY AND AN APPARATUS FOR USING THE METHOD

[75] Inventor: Beltcho A. Beltchev, Sofia, Bulgaria

[73] Assignee: Bulgarska Industrialna Stopanska Associatia, Sofia, Bulgaria

[21] Appl. No.: 598,558

[22] Filed: Oct. 16, 1990

Related U.S. Application Data

[60] Division of Ser. No. 265,194, Oct. 31, 1988, Pat. No. 4,999,118, which is a continuation-in-part of Ser. No. 910,904, Sep. 24, 1986, abandoned.

[51] Int. Cl.$^5$ .............................................. B01D 25/68
[52] U.S. Cl. .................................... 210/185; 210/225
[58] Field of Search ............... 210/185, 225, 232, 224, 210/231, 230, 184

[56] References Cited

U.S. PATENT DOCUMENTS

| | | | |
|---|---|---|---|
| 644,124 | 2/1900 | Bradley | 210/225 |
| 1,049,715 | 1/1913 | Hopkins | 210/185 X |
| 4,226,721 | 10/1980 | Baas | 210/225 |

Primary Examiner—Frank Spear

[57] ABSTRACT

The invention discloses an improved method and apparatus for utilizing the principal of dewatering and drying a liquid/solid slurry. Unlike the prior known method of consecutive material thickening, filtering, crushing and then subsequent drying which is achieved by means of an appropriate apparatus for each of the above enumerated process steps, in the present invention all these process steps are achieved with only one apparatus.

The apparatus for the implementation of this method comprises consecutively connected filter press, feeding-compressing container with pressure feed chamber and a built-in heat exchanger and vacuum collector with a vacuum pump. The apparatus for carrying out the method is compact, has low energy consumption, and environmental cleanliness. The method ensures that the separated liquid phase can be used as a heat carrier for industrial and municipal needs. In addition, the process of the invention is fully automated.

The total time for the consecutive implementation of thickening, filtering, crushing and drying compared to the prior known methods is considerably decreased by the method of this invention.

Moreover, in the drying process of the invention only a fraction of the residual liquid is vaporized, while the remainder is expelled without its evaporation. Further, the extraction of salts dissolved in the liquid is achieved, since the liquid is not vaporized.

10 Claims, 2 Drawing Sheets

METHOD FOR DEWATERING AND DRYING A LIQUID/SOLID SLURRY AND AN APPARATUS FOR USING THE METHOD

CROSS REFERENCE TO RELATED APPLICATIONS

This application is a divisional patent application of U.S. Ser. No. 07/265,194, filed Oct. 31, 1988, which matured into U.S. Pat. No. 4,999,118, on Mar. 12, 1991. That application is, in turn, a continuation-in-part patent application of U.S. Ser. No. 06/910,904, filed Sept. 24, 1986, now abandoned.

BACKGROUND OF THE INVENTION

1. Field of the Invention

This invention relates to a method and apparatus for dewatering and drying of mixtures of liquids and solids dispersed in them (liquid/solid slurry).

2. Description of Prior Art

There is a prior-known method for dewatering and drying where the materials are gradually thickened, filtered, broken down and then subjected to drying.

The equipment needed for this method includes four separate units connected in sequence by the required conveying connections, and the slurry must be thickened, filter pressed (or vacuum filtered), crushed and then dried.

This method is effected in four different sectors. Relatively large energy consuming apparatuses are required as well as large floor space which makes such installations expensive to maintain. Furthermore, these apparatuses are ecologically incompatible with the environment. The sedimentation-thickening process is quite slow, and the separated liquid is not sufficiently clear.

SUMMARY OF THE INVENTION

It is a general object of the present invention to provide a method and apparatus wherein the dewatering and drying steps are performed simultaneously using one processing unit and the dried material can be automatically discharged without adhering to the heating and filtering surfaces. It is another objective of the invention to reduce energy consumption and production costs as compared to the installations of the state of the art.

In the method of the invention, the dewatering and drying of mixtures of liquids and solid particles dispersed in them (slurry) occurs by the simultaneous effect of decompression and steam pressure set up inside the material, where the separated liquid phase is collected under vacuum.

The apparatus for carrying out the method of the invention comprises a filter press, a feeding-compression container with a pressure feed chamber and built-in heat exchanger, and a vacuum collector with vacuum pump, all connected sequentially.

The filter press used for the realization of the method of the invention includes alternating sequentially connected vacuum filter plates and heat plates; the heat plates being suspended parallel to each other and being vibrated and connected between a fixed head, linked with a vacuum collector and a feeding-compression container, and a self-propelled head linked by assembled connections to the vacuum collector and the feeding-compression container, and a hopper with a screw worm fitted under the heads and the plates. Air ducts are arranged to the upper part of the hopper over which mobile screens are mounted suspended onto a ventilation dome.

The heat plate is made of a closed frame and is divided symmetrically in its largest section by a heating element forming two reception chambers which are connected to a feed hole. A main draining channel is fitted within the frame, insulated from the reception chambers. The heating element consists of a membrane connected to our electrical or fluid power source which is insulated from the main draining channels. The vacuum filter plate is made of a closed frame and a vacuum chamber. Porous partitions with a feed hole, the latter insulated from the vacuum chamber, are fitted in the frame and are connected by means of intermediate channels to the vacuum chamber. The heat plates are suspended on vibrating parallel members by means of sliding rollers. The vacuum filter plates are connected to the heat plates by pivots. The self-propelled head is suspended by rollers in a ventilation dome, and is connected to fixed horizontal screws by means of rotating sleeves.

A motor reducing gear is attached to the self-propelled head in which the rotating sleeves are fitted. The internal part of the self-propelled head is a vacuum filter plate, the main draining channel of which is connected, via its external end, to a collector (manifold) pipe, which is connected by means of a dismountable vacuum connection to a pipe of a heat-exchanger built into the feeding-compression container. The hole of the filter plate of the self-propelled head is connected by means of a dismountable pressure connection and a pressure feed pipe to the feeding-compression container. The fixed head is connected to the support columns and the ventilation dome. Its internal part is formed by a plurality of vacuum filter plates, the main draining channel of which, by means of its external end, is connected to the collector pipe, the latter being connected to a vacuum collector across the heat-exchanger. The vacuum filter plate hole of the fixed head is connected to the feeding-compression container.

The filter press is fully enclosed, a hopper with a discharging screw-worm being mounted in its lower part, under the heat and vacuum filter plates. Forced air ducts are fitted over the hopper walls, over which mobile screens are suspended. The ventilation dome extends along the longitudinal axis of the press and is connected to the vertical supporting columns of the press. The feeding-compression container consists of a pressure feed chamber with a built-in heat-exchanger connected to the vacuum collector input. The upper part of the feed chamber is connected to a balance gas cylinder and its lower part is connected to the feed holes of the self-propelled and fixed heads, on one side, and to the compression unit, on the other, the compression unit being also directly connected to the feed holes of the heads. The vacuum collector is a heat insulated vacuum vessel connected to the heat-exchanger and the vacuum pump, and by means of a discharge valve it is connected either to the user equipment or the storage equipment of the extracted liquid phase having heat energy accumulated in it.

The advantages of this invention reside in that the method is implemented by means of a compact apparatus;, the energy costs are reduced;, there is no environmental pollution; and the separated liquid phase can be used as an energy carrier for different uses and for domestic applications. The apparatus is fully automatic and there is no direct contact between the operator and the treated material.

The thermal energy recovered in the heating membranes, according to the present invention, is transferred directly through the membrane walls onto the filter cake formed in the chambers of the heat plates.

The present invention surmounts the vaporization problems of the prior art. The thermal energy, according to the present invention, creates a so-called "steam jacket" around the heating membranes, thus vaporizing only a part of the liquid remaining in the cake after the filtration process. The advantage of the present invention is that the "steam jacket" is formed in the closed volume limited by heating membranes, cake and frame. Thus, under the action of the piston effect of the "steam jacket", a substantive portion of the residual liquid remaining after the filtration process is expelled without vaporization and together with the steam, through the vacuum filter plates, enters in the heat-exchanger where it heats the suspension being fed for the next cycle. By means of this design, considerable savings of thermal energy for cake drying after filtration is realized.

The present invention also overcomes the problem of heat conductivity. The filtered cake formed in the chambers performs the function of a thermal insulation partition between the porous partitions and the heating membranes. A great advantage of the inventive apparatus is that the porous partitions or the cloths (filter cloths) are subjected, during the drying process only to the action of steam heating, and that the water heated in the capillaries, the temperature of which in reaching the porous partitions or filter cloths is markedly reduced, can not influence their mechanical properties.

Still another advantage of the present invention is that the temperature of the heating membranes can be considerably higher at the beginning of the drying process (i.e., 200°–300° C.). Thus, the "steam jacket" is formed in a very short period of time and with higher pressure, which reduces cycle duration and energy consumption.

In the present invention, the porous partitions performing the functions of filter cloths are "gas impermeable" over all their surfaces in the contact area, i.e., where the plate frames are clamped together. This avoids the flow-out of liquid along the capillaries of the filter cloths.

The present invention also overcomes the energy loss disadvantage of the prior art devices. The feeding-compression container has a pressurized feed chamber, the upper part of which is connected to a balance gas cylinder. In case of an emergency stop of the compression unit, i.e., the pump, the compressed gas contained in the balance gas cylinder (with a suitable volume) maintains the filtration process for a certain period of time. An economic benefit from saved filtration energy may be obtained by stopping the compression unit at a suitable moment, thus completing the filtration process on the basis of the stored energy of the compressed gas in the balance gas cylinder.

The construction according to the present invention realizes heat exchange between entering slurry and outgoing filtrate. Therefore, in this way, the following advantages are achieved:

shortening of the filtering process duration;
achieving lower final humidity in filtration;
heating of the filtered cake starts at a higher temperature;

better protection against vacuum pump overheating is achieved;
better extraction of salts dissolved in the liquid is possible, since only part of the liquid is vaporized.

The present invention provides for thermal frames which ensure complete cake drying. The fully dried cake does not stick to the porous partitions and is not retained by the heating membrane of the heat plate. The filtrate is separated through the porous partitions of the vacuum chamber connected with the main draining channels and delivers its accumulated heat energy to the heat-exchanger.

In the present invention, the impact from the falling material due to vibration is absorbed entirely by the robust box and the impact body. In this manner bending and other considerable elastic deformations are avoided, which reduces the effect of the shaking off. The bearings supporting the eccentrics also are not subjected to impact forces.

BRIEF DESCRIPTION OF THE DRAWINGS

With these and other objects in view, which will become apparent in the following detailed description, the present invention which is shown only by example, will be clearly understood in connection with the accompanying drawings, in which:

FIG. 3 is a schematic flow diagram of the filter press heat plate;

FIG. 4 is a cross-sectional view of the heat plate shown in FIG. 3;

FIGS. 5 and 6 are partial side-elevational view, partially in cross-sections, of the heat plate;

FIG. 7 is a partial side-elevational view, partially in cross-section, of the filter press filter plate;

FIG. 8 is a cross-section of the vacuum filter plate shown in FIG. 7;

FIG. 9 is a schematic side-elevational view including a flow diagram of the feeding-compression container;

FIG. 10 is a schematic flow diagram of the self-propelled head shown in cross-section; and FIG. 11 is a schematic view of the filter press shown in side-elevation and illustrating the parallel members which are being vibrated.

DETAILED DESCRIPTION OF THE PREFERRED EMBODIMENTS

Figure 1:
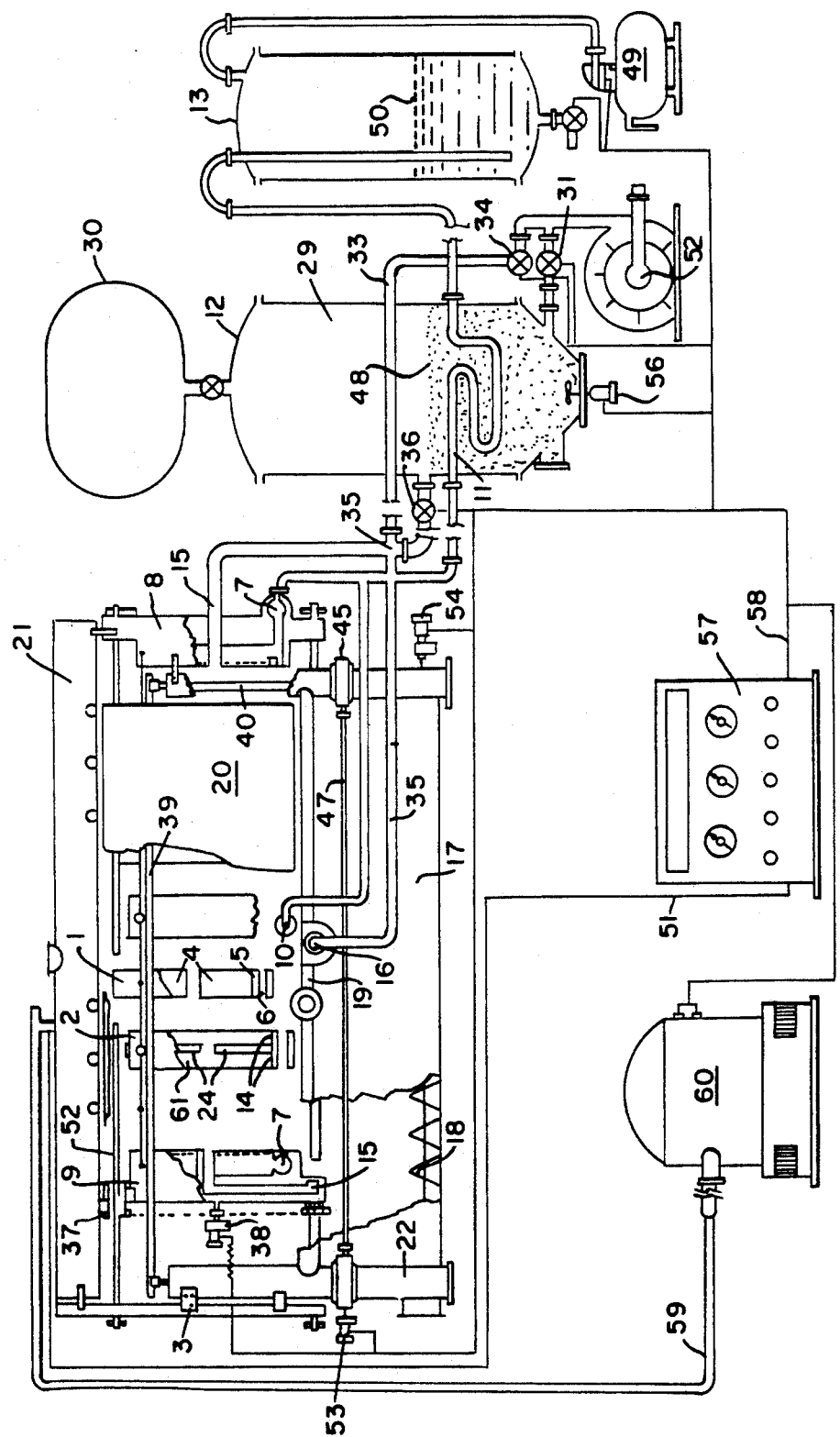
FIG. 1 is a schematic side-elevational view of the apparatus for carrying out the method of the invention.
Figure 2:
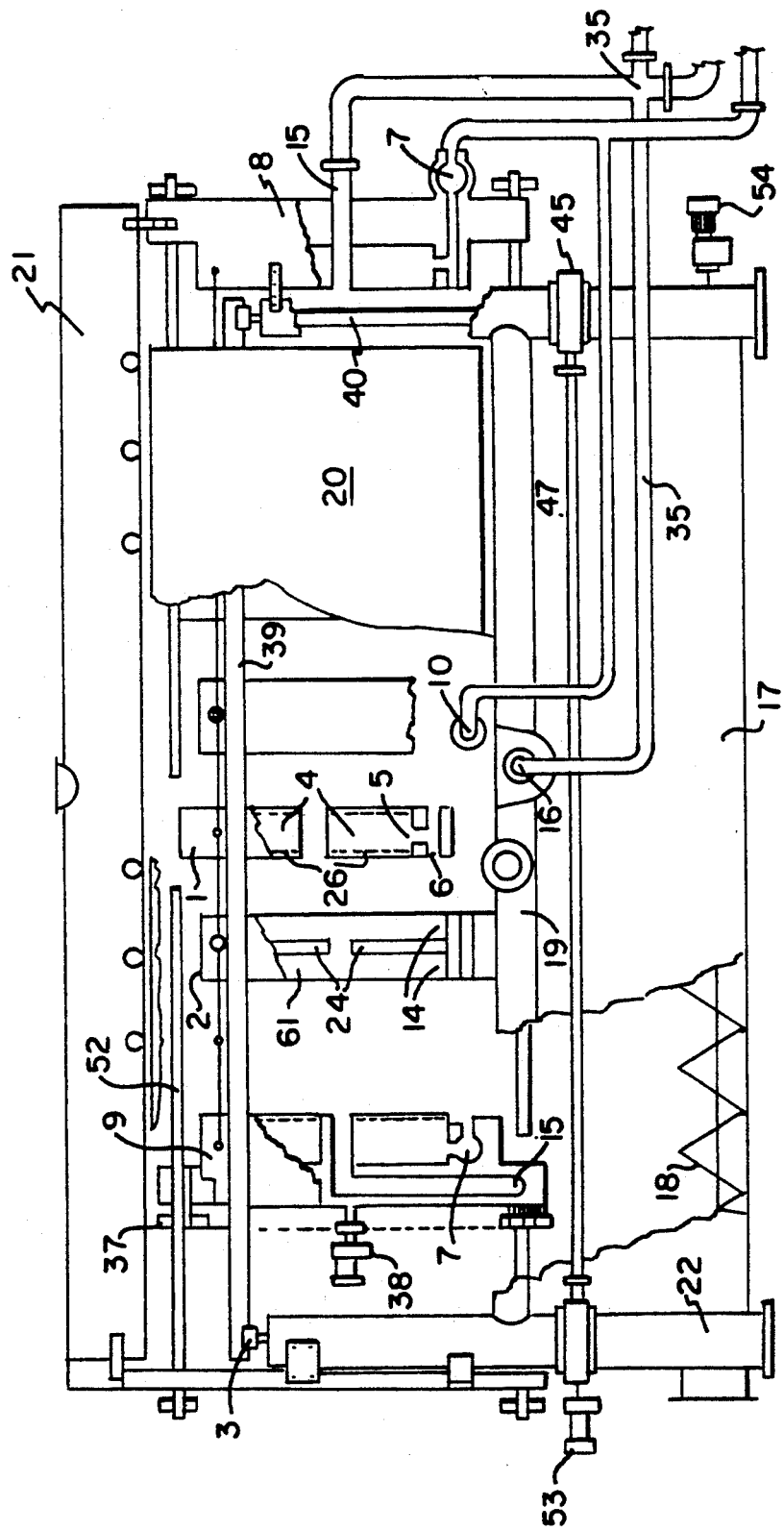
FIG. 2 is a portion of the schematic side-elevational view of FIG. 1 partially shown in section.

Referring to FIGS. 1–3, the dewatering and drying filter press comprises alternating vacuum filter plates 1 and heat plates 2, mounted in succession on support members 64 and suspended on rollers 63 which rest on rails 39, which are adapted to be vibrated by pistons 3. A vacuum chamber 4 is built into each vacuum filter plate 1. Each one of the vacuum chamber 4, by means of intermediate channels 5, draining main channels 6 (FIG. 7) and collector pipes (manifold) 7, mounted on a fixed head 8, is connected by means of a heat-exchanger 11, fitted in a feeding-compression container 12, to the vacuum collector 13.

The draining main channels 6 are linked also with a collector pipe 7 mounted in the self-propelled head 9, and by means of the dismountable vacuum connection 10 are linked through the heat-exchanger 11 to the vacuum collector 13.

The dismountable vacuum connection 10 (FIG. 10) comprises a concave conical valve-seat hole 65 on one side, and on the other, a moving elastic valve cone 66, slidably mounted on a fixed pipe 69 by guides 67 and spring 68, the slidably moving elastic cone 66 being axially mounted on the fixed pipe 69.

Reception chambers 14 (FIGS. 1-4) of the heat plate 2 are connected through feeding channels 15 of the fixed head 8 to the feeding-compression container 12.

The dismountable pressure connection 10 (FIG. 10) comprises another concave conical hole 70 on one side, and an elastic conical nozzle 71 on a confronting side, and this conical nozzle 71 is attached to another fixed pipe 72, coaxially disposed with respect to the axis of the nozzle 71.

Hopper 17 with screw-worm 18 (FIGS. 1 and 2) is disposed under heads 8 and 9 and plates 1 and 2. Air ducts 19 are mounted on the upper part of hopper 17 and mobile screens 20 are fitted over them and are suspended in a ventilation dome 21, the latter being mounted on supporting columns 22.

Each of the heat plates 2 (FIGS. 3-5) is made of a closed frame 23, which is divided in its largest cross-section by a heating electrical membrane 24 having electrical heaters 62, or heating fluid membrane 61 This membrane 24 defines two reception chambers 14, connected to a feed hole 15. The insulated reception chambers 14, the heating membranes 24, 61, and the draining main channels 6, are all mounted on frame 23.

The slurry mass 48 enters reception chamber 14 where its flow is restricted by frame 23 and the opposite by positioned heating membrane 24 or 61 and porous partition 26 of vacuum filter plate 1 (FIG. 7). The vacuum filter plate 1 (FIGS. 7 and 8) is made of a closed frame 27 and vacuum chamber 4. On both sides of the vacuum chamber 4, porous partitions 26 with a feed hole 15 are fitted, which porous partitions 26 are gas impermeable along their entire volume in the contact zone 28 within the closed frame 27. The vacuum chamber 4 is connected by intermediate channels or passages 5 to the draining main channel 6 which extends transversely in the closed frame 27.

The feeding-compression container 12 (FIG. 9) comprises a pressure feed chamber 29 with a built-in heat-exchanger 11. The upper part of the pressure feed chamber 29 is connected to a balance gas cylinder 30. In its lower part an agitator 56 is housed. The lower part of chamber 29 is connected to the compression unit 32 by means of a valve 31. The pressure feed chamber 29 is shunted by means of shunting pipe 33, which, by means of a second valve 34, is connected to the compressing unit 32. At the other end it is connected to pressure feed pipe 35 (FIGS. 1 and 2). The pressure feed pipe 35 is connected via a third valve 36 to the chamber 29, and its other end is connected to a feed inlet 15 of the fixed head 8 and via another branch pipe to the dismountable pressure connection 16 (FIGS. 1 and 2).

Driving sleeves 37 are mounted on the self-propelled head 9 (FIG. 10), which sleeves are driven by a motor reducing gear 38. Drain main channels 6 are in communication with a collector pipe 7 which is adapted to be connected to a dismountable vacuum connection 10. The feed hole 15 of the self-propelled head 9 is in communication with a dismountable pressure connection 16 (FIG. 1). The driving sleeves 37 are mounted on stretching screws 52 to support the self-propelled head 9.

The vibration pistons 3 (FIG. 11) are operatively connected to supporting horizontal elements 39. The pistons 3 are mounted on vertical supporting columns 22. In its lower part, each vertical piston shaft 40 is slidably mounted in a mobile impact body 42 with rollers 43, frictionally connected to an eccentric cam 44, and is mounted on a robust box 45, which, in turn, is mounted on a supporting column 22. The eccentric cams 44 are mounted on shafts 47 which extend along the longitudinal axis of the filter press and are connected by an untwisting connection and adjustable motor to a reducing gear 53.

The vacuum collector 13 (FIG. 1) in its upper part, is connected to a vacuum pump 49, and in its lower part has a drain valve 55. The electrical control panel 57 is connected by control connections 58 to a motor reducing gear 38 and a second motor reducing gear 54, adjustable motor reducing gear 53, the agitator 56, electro-valve 31, electro-valve 34, electro-valve 36, electro-valve 55, the compression pump unit 32, the vacuum pump 49 and the fluid heating source 60. The heating electrical membrane 24 is connected by means of a flexible electrical connection 51 to the electrical control panel 57, and the heating fluid membrane 61 is linked to the heating fluid source 60 by a flexible pipe connection 59.

MANNER OF OPERATION

The apparatus of the invention operates as follows:

The mixture (slurry mass) to be thickened, filtrated and dried enters the closed filter pres under the effect of the compression pump 32 through valve 34, the shunting pipe 33, the pressure feed pipe 35, the feed hole 15 of the fixed head 8 and dismountable pressure connection 16, and feed hole 15 of the self-propelled head 9 in reception chamber 14 of heat plates 2. Under the pressure of the entering slurry mass 48, the elastic conical nozzle 71 expands and fits closely in the concave conical hole 70 (FIG. 10), so that in its closed position the dismountable pressure connection 16, forming part of the elastic conical nozzle 71, is self-sealed and no liquid runs out.

Simultaneously, in the initial cycle, the pressure feed chamber is filled through valve 31.

After the reception chamber 14 has been filled, the shunting pipe 33 is switched off by way of valve 34, after which the compressing process starts where slurry 48 is fed from the pressure feed chamber 29 by means of valve 36. Pressure in the balance gas cylinder 30 is leveled off with that of the compression pump 32.

In case of an emergency stop of the compression pump, the compressed gas contained in the balance gas cylinder (with suitable volume) maintains the filtration process for a certain period of time. When the electric supply is cut off, valves 31 and 34 remain closed and the filtration process continues at the expense of the gas compressed in cylinder 30. Thus, certain energy autonomy for the filtration process is achieved.

Vacuum formed in the vacuum collector 13 by vacuum pump 49 begins to take effect from the point in time when the initial delivery of slurry 48 into the closed filter press occurs. Thus, vacuum is formed in vacuum chambers 4 by means of heat-exchanger 11, dismountable vacuum connection 10, collector pipes 7, draining main channels 6 and intermediate channels 5. When the self-propelled head 9 closes, the dismountable vacuum connection 10 is sealed as a result of pressing the elastic cone 66 to the walls of the concave conical hole 65 under the effect of spring 68 (FIG. 10). This effect is intensified by vacuum action and dismountable vacuum connection 10 is self-sealed, eliminating any chance of atmospheric air entry. Under the vacuum effect, filtrate 50 starts to run across porous partitions 26 into vacuum chambers 4, the filtration rate increasing because of the hydraulic pressure formed in reception chambers 14. Under this combined action, filtrate 50 runs out and is accumulated in vacuum collector 13.

After the peak values of pressure and vacuum, necessary for dewatering of the cake 25 in chambers 14 are reached, electric voltage is transmitted to heating membranes 24 by flexible electrical connection 51 from the electrical control panel 57, or heating fluid to membranes 61 by way of flexible pipe connection 59 from the heating fluid source 60. The sharp temperature rise creates a "steam jacket" around heating membranes 24 or 61 and under its action intensive expulsion of capillary liquid from cake 25 begins from membranes 24 or 61 toward porous partitions 26. There, under the vacuum action, both liquid and gas phases are sucked in and collected in vacuum collector 13 together with the heat energy accumulated in them. Part of the accumulated heat is transferred by means of heat exchanger 11 to the pulp mass present in the pressure feed chamber 29.

Thus, during the next cycle, slurry 48 enters with a higher temperature, accelerating the filtration process rate, realizing cycle time reduction and lower energy consumption. The extraction expulsion of capillary liquid from cake 25 considerably reduces the energy required for drying, i.e., for evaporation, as a considerable part of the liquid phase is not transformed into steam.

After reaching the required final humidity, the vacuum is released and the filter press opens by the action of the self-propelled head 9. The self-propelled head 9 is set in motion by means of motor reduction gear 38, connected to driving sleeves 37. The latter revolve around the fixed stretching screws 52.

The blow-drying of the cake 25, separated in the reception chambers 14 is effected through ventilation dome 21, which intakes the required air from air ducts 19. The ventilation system ensures ventilation of the space of the filter press where the vacuum filter plates 1 and heating plates 2 are disposed. In case the plates are in the open position, ventilation dome 21 is sucking out all the residual vapors separated from the cake 25, collected in reception chambers 14, while the necessary compensating air, fed through air ducts 19 flows uniformly and primarily through the interspaces of the set apart vacuum filter plates 1 and heating plates 2.

When the cake 25 has been dried to the required final moisture or after supplementary blow-drying, if needed, the adjustable motor reductor gear 53 is switched on, which, through eccentric cams 44 and impact bodies 42, sets the vibrating parallel bars 39 in a vertical vibrating motion, whereby the latter are raised under the action of eccentric cams 44 and then drop freely, and through the vertical support rods 40 and mobile bodies 42 impact on the robust box 45, mounted on supporting columns 22.

The next cycle starts after the cake 25 has been shaken off. The pure filtrate 50, accumulated in vacuum collector 13, together with the heat accumulated in it, is periodically discharged through drain valve 55, to be used for industrial or municipal needs. The cycle proceeds without any environmental pollution since the ensuing dust, aerosols, steam, vapors or any other components are included in the treated slurry mass.

Servicing of the press interior is carried out by opening the mobile screens 20. Electrical energy supply, control and adjustment of the filter press operation, operation of the feeding compression container 12, and that of the vacuum collector 13, is adjustably supplied from the electrical control panel 57, by means of control connections 58.

Electrical current to heating membranes 24 is supplied by means of flexible electrical connection 51, from the electrical control panel 57; fluid heating membranes 61 are supplied with heating fluid from fluid source 60, through flexible pipe connection 59, the operation being monitored and controlled from electrical control panel 57.

The simultaneous supply and draining of the filter press by the fixed head 8 and the self-propelled head 9 considerably accelerates the production cycle.

Although the invention is described and illustrated with reference to a plurality of embodiments thereof, it is to be expressly understood that it is in no way limited to the disclosure of such preferred embodiments, but is capable of numerous modifications within the scope of the appended claims.

We claim:

1. An apparatus for dewatering and drying of a liquid/solid slurry mass, comprising
   a plurality of vacuum filter plates having vacuum chambers, and
   a plurality of heat plates having reception porous chambers;
   said filter plates and said heat plates being connected alternately in succession;
   said vacuum filter plates and said heat plates being pivotally mounted at a top portion thereof and suspended from vibrating means;
   said heat plates each having a fluid membrane with a first central throughbore, said fluid membrane allowing the passage of fluid therethrough and said porous chambers lying on opposite sides of said membrane;
   said vacuum filter plates each having a pair of porous partitions with a second central throughbore, said first central throughbore communicating with said second central throughbore, said vacuum chamber being disposed between said porous partitions;
   said vacuum chambers each having an intermediate canal connected to a draining main canal which main canal is connected to a vacuum source;
   said succession of alternately connected plates being arranged such that said throughbores and said main canal terminate at one end with a self-propelled head and at another end with a fixed head;
   a feeding compressing container having a heat exchanger, said container being connected to said throughbores for feeding the slurry to be dried;
   said heat exchanger connecting said main canals to said vacuum source, whereby said slurry is fed from said container through said throughbores where its solid part is separated by said membranes and its liquid part is drawn through said vacuum chambers into said heat exchanger and to a drain;
   a hopper with a screw worm mounted beneath said plates and said fixed and self-propelled heads, said hopper having air ducts and a plurality of supporting columns, a ventilation dome being mounted on said columns;

whereby after said liquid part is removed from said slurry, said solid part is ventilated by said air ducts and said ventilation dome, loosened from said membranes by said vibrating means, collected in said hopper, and discharged from said hopper by said screw worm.

2. An apparatus according to claim 1, wherein the heat plates each comprise
   a closed frame having an electric heating element within said membrane between said porous chambers;
   a main canal, insulated from said porous chambers and communicating with the draining main canal of said vacuum filter plates
   said heating element being insulated from the main canal.

3. An apparatus according to claim 1, wherein the porous partitions and the central throughbore of the vacuum filter plates are gas impermeable.

4. An apparatus according to claim 1, wherein the feeding compressing container comprises
   pressure feed chamber with an upper and lower part, said heat exchanger being built in said pressure feed chamber;
   a balance gas cylinder, connected to an upper part of said chamber;
   a compressing unit, connected by a first valve to a lower part of said chamber; and
   said compressing unit being connected by a second valve to a shunting pipe; and
   a third valve connecting the pressure feed chamber to said throughbores.

5. A filter press, according to claim 1, wherein the vibration means comprises
   supporting horizontal elements and vertical supporting columns, vertical supports being fitted in a central cavity of the vertical supporting columns, said supporting horizontal elements being connected by said vertical supports,
   a mobile impact body having rollers frictionally connected to an eccentric resting loosely on a lower part of each vertical support,
   a robust box and an untwisting connection;
   whereby the vertical supports rest in said robust box and shafts of the eccentrics are interconnected by said untwisting connection.

6. An apparatus for dewatering and drying of a slurry mass liquid/solid, comprising
   a plurality of vacuum filter plates having vacuum chambers, and a plurality of heating plates having reception chambers;
   said filter plates and said heating plates being connected alternately in succession;
   said vacuum filter plates and said heating plates being pivotally mounted at top portion thereof and suspended from vibrating means;
   said heating plates each having a heating electrical or fluid membrane with a first central throughbore, said first central throughbore of said heating electrical or fluid membrane allowing the passage of slurry therethrough and said reception chambers laying on opposite sides of said electrical or fluid membrane;
   said vacuum filter plates each having a pair of porous partitions with a second central throughbore, said first central throughbore communicating with said second central throughbore through said reception chamber being disposed between said porous partition and said heating plate;
   said vacuum chamber each having an intermediate canal connected to a draining main canal which main canal is connected to a vacuum source;
   said succession of alternately connected plates being arranged such that said central throughbores and said draining main canal terminate at one end with a self-propelled head and at another with a fixed head;
   a feeding compressing container having a heat exchanger, said container being connected to said central throughbores for feeding the slurry to be dewatered and dried;
   said heat exchanger connecting said draining main canal to said vacuum source, whereby said slurry is fed from said container through said central throughbores in said reception chambers, where its solid component separated by said porous partitions and its liquid component is drawn through said vacuum chambers in said heat exchanger and to a drain.

7. An apparatus according to claim 6, wherein the heating plates each comprise
   a closed frame having an electric or fluid heating element within said membrane between said reception chambers;
   a main canal, insulated from said reception chambers and communicating with the draining main canal of said vacuum filter plates;
   said heating element being insulated from the main canal.

8. An apparatus according to claim 6, wherein the porous partitions of the vacuum filter plates are gas impermeable along all their peripheral area contacting the frames of said vacuum filter plates;
   the central throughbore of said vacuum filter plates is gas impermeable in relation to the vacuum chamber of said vacuum filter plates.

9. An apparatus according to claim 6, wherein the feeding compressing container comprises
   a pressure feeding chamber with an upper and lower part, said heat exchanger being built in said pressure feeding chamber;
   a balance gas cylinder, connected to the upper part of said chamber;
   a compressing unit, connected by a first valve to the lower part of said chamber;
   said compressing unit being connected by a second valve to a shunting pipe;
   a third valve connecting the pressure feeding chamber to said throughbores.

10. A filter press, according to claim 6, wherein the vibrating means comprises
    supporting horizontal elements and vertical supporting columns, vertical supports being fitted in a central cavity of the vertical supporting columns, said horizontal supporting elements being connected by said vertical supports;
    a mobile impact body having rollers frictionally connected to an eccentric supported in a robust box;
    said mobile impact body resting one the upper passive part of said robust box;
    said robust box being mounted in the lower part of each of said vertical supporting columns;
    the shafts of said eccentrics are interconnected by untwisting connection.

* * * * *